S. S. EVANS.
Broom Head.
No. 55,843.                                    Patented June 26, 1866.
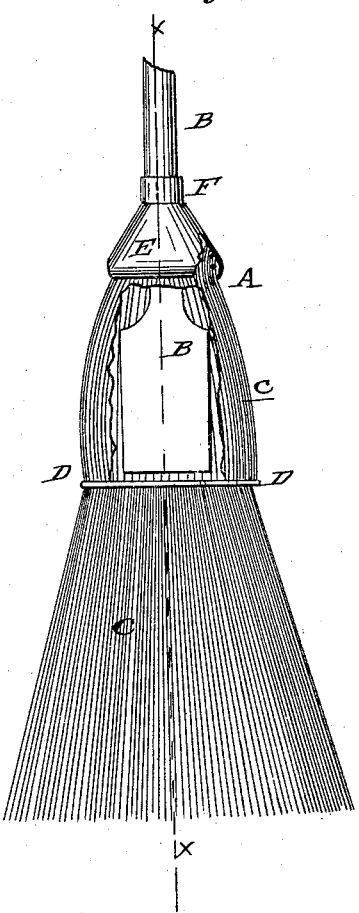
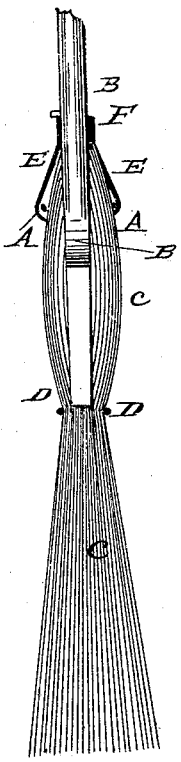
Witnesses
Jas A. Service
J W B Courgton
Inventor
S S Evans
Per Munn & Co Attys

UNITED STATES PATENT OFFICE.

S. S. EVANS, OF EL PASO, ILLINOIS.

IMPROVED BROOM-HEAD.

Specification forming part of Letters Patent No. 55,843, dated June 26, 1866.

*To all whom it may concern:*

Be it known that I, S. S. EVANS, of El Paso, in the county of Woodford and State of Illinois, have invented a new and useful Improvement in Brooms; and I do hereby declare that the following is a full, clear, and exact description thereof, which will enable others skilled in the art to make and use the same, reference being had to the accompanying drawings, forming part of this specification, in which—

Figure 1 is a side view of my improved broom, parts being broken away to show the construction. Fig. 2 is a longitudinal section of the same, taken through the line $xx$, Fig. 1.

Similar letters of reference indicate like parts.

My invention has for its object to furnish an improved broom, simple in construction, light, durable, and cheap; and it consists in the combination of a ring and handle, constructed as hereinafter described, with each other, with the clasp, and with the broom-corn.

A is the ring that confines the corn at the upper end of the broom-head. This ring should be made sufficiently strong to resist the strain caused by driving the handle B into the broom-head.

The handle B is made slightly tapering toward its upper end, in the ordinary manner of a broom-handle; but its lower end is enlarged into the form shown in the drawings, so as to act as a wedge in tightening and holding the corn C in its place in the ring A.

D is a clasp passing around the corn just below the lower end of the handle B, confining the said corn in its place and giving form to the broom.

E is the cap, which may be made of one piece of tin cut out into proper form and having its edges soldered or otherwise secured together.

The ferrule F may be permanently attached to the upper end of the cap E, and should be of such a length as will give sufficient bearing to the handle B.

In making the broom, the ring A is closely filled with corn. The handle B is then forced in from below and driven up until the enlarged part $b'$ is brought into its proper position, as shown in the drawings. The clasp-ring D is then slipped on and drawn to its proper place, where it is then bent down into the proper shape to give the desired form to the broom-head, by means of a hammer or by any other convenient means. The cap E may then be slipped on and secured in place by a pin, nail, or screw in the ordinary manner.

The cap E does not form an essential part of the broom-head, the corn being securely held in place without it. It is put on simply to cover the upper ends of the corn.

This broom is very simple in construction; can be made very cheaply, and when made is very firm and compact, and at the same time very light.

I claim as new and desire to secure by Letters Patent—

An improved broom, formed by combining the ring A and handle B, constructed as described, with each other and with the clasp D and corn C, substantially as described, and for the purpose set forth.

S. S. EVANS.

Witnesses:
 THEODORE AMSBARY,
 AMOS C. BOLYER.